United States Patent [19]

Wiesner

[11] 3,723,437
[45] Mar. 27, 1973

[54] 4,10-(METHANIMINOMETHANO PHENANTHRENE DERIVATIVES

[75] Inventor: Karel Wiesner, Fredericton, New Brunswick, Canada

[73] Assignee: American Home Products Corporation, New York, N.Y.

[22] Filed: Sept. 15, 1970

[21] Appl. No.: 72,508

Related U.S. Application Data

[63] Continuation-in-part of Ser. No. 846,962, Aug. 1, 1969, abandoned.

[52] U.S. Cl. ............... 260/285, 424/260, 260/590, 260/473 F, 260/340.9, 260/326.5 C
[51] Int. Cl. ............................................. C07d 35/28
[58] Field of Search ................................... 260/285

[56] References Cited

UNITED STATES PATENTS

| | | | |
|---|---|---|---|
| 3,466,277 | 9/1969 | Merz et al. | 260/285 |
| 3,474,102 | 10/1969 | Brown et al. | 260/285 |
| 3,506,765 | 4/1970 | Seki et al. | 260/285 |
| 3,007,932 | 11/1961 | Weiss | 260/285 |

OTHER PUBLICATIONS

C. A. Si: 8,770–8,711a (1957) Sugimoto et al.
Bentley: The Chemistry of the Morphine Alkaloids, Oxford, Clarendon Press (1954) pages 134–135 & 253–254.

C. A. 6th Collective Index (1957–1961) "-Methanimino Methano – Phenanthrene," page 7,270 S.

*Primary Examiner*—Henry R. Jiles
*Assistant Examiner*—S. D. Winters
*Attorney*—Andrew Kafko, Dwight J. Potter and Joseph Martin Weigman

[57] ABSTRACT

There are disclosed herein organic amines, and their pharmaceutically acceptable acid addition salts, which are 3,4,9,10-tetrahydro-6-methoxy-(2H)-4a,10-(methaniminomethano)-phenanthren-2-ol, 1,3,4,9,10,10a-hexahydro-6-methoxy-(2H)-4a,10-(methaniminomethano)-phenanthren-2-ol,3,4,10,10a-tetrahydro-6-methoxy-(9H)-4a,10-(methaniminomethano)phenanthren-3-ol and 1,2,3,4,9,10-hexahydro-3,6-dimethoxy-α-methyl-α-alkyl-or aralkyl-3,10a-ethano-4a,10-(methaniminomethano)phenanthrene-2-methanol and their corresponding N-(lower alkyl)derivatives. Process for the synthesis of these compound, which includes a facile preparation of the key intermediate, 3,4,9,10-tetrahydro-6-methoxy-12-methyl-4a,10-(methaniminomethano)phenanthrene-2,11(2H)-dione, is also disclosed. The amines possess analgesic, antibacterial and antifungal activities, and methods for their use are disclosed.

5 Claims, No Drawings

4,10-(METHANIMINOMETHANO PHENANTHRENE DERIVATIVES

This application is a continuation-in-part of my earlier-filed U.S. Patent application Ser. No. 846,962, filed Aug. 1, 1969 now abandoned.

This invention relates to a novel series of methaniminomethanophenanthrenes, the processes for their preparation and to intermediates used for their preparation.

More specifically, this invention relates to substituted 2H-4a,10-(methaniminomethano)phenanthrene derivatives which may be represented by Formula I,

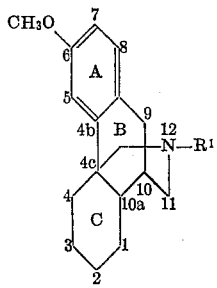

I.

in which $R^1$ represents a hydrogen or lower alkyl and ring C of the methaniminomethanophenanthrene nucleus represents a substituted cyclohexane ring with optional substitutions selected from the group,

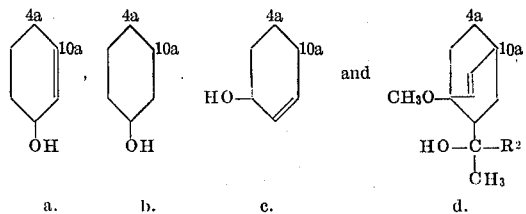

designated a, b, c, and d, respectively and $R^2$ of cyclohexane ring d. represents a lower alkyl, benzyl or phenethyl.

This invention includes the non-toxic, pharmaceutically acceptable acid addition salts of the methaniminomethanophenanthrenes of this invention. Such salts are prepared from suitable acids, such as inorganic acids, for instance, hydrochloric, hydrobromic, sulfuric, phosphoric, or sulfamic acid; or organic acids, for instance, acetic, maleic, lactic, ethanedisulfonic, glycolic, salicyclic and fumaric acids. The acid addition salts are prepared by reacting the base with either one equivalent of acid or preferably with an excess in an organic solvent such as ether or an ethanol-ether mixture. Alternatively, an acid salt of the base, say the hydrochloride, can be reacted with a salt such as the ammonium salt of an organic acid in an aqueous mixture to form an insoluble salt by double decomposition.

The novel methaniminomethanophenanthrenes of this invention have been found to possess interesting pharmacological properties which render them useful as synthetic medicinals. More particularly these compounds in standard pharmacological tests, for example, in procedures similar to those described by Ralph Banziger in "Pharmacologic Techniques in Drug Evaluation", Year Book Medical Publishers, page 392, for the testing of analgesic agents, have exhibited utility as analgesic agents, as do the analgesics, morphine and phenazocine. However, unlike morphine and phenazocine, the methanobenzazocines of this invention are substantially free of deleterious pharmacodynamic effects. An example of such a deleterious effect is the excitatory effect of morphine on the central nervous system observed in both mice, see D.L.J. Bilbey et al., Brit. J. Pharmacol., 15, 540 (1960), and man, see L.A. Woods in "Pharmacology in Medicine", V.A. Drill, Ed., 2nd ed., McGraw-Hill Book Company, pages 218–221. The lack of excitation properties for the methanobenzazocines is demonstrable in pharmacological procedures, such as, for example, the procedure used by Bilbey, see reference cited above.

The compounds of this invention exhibit other desirable pharmacological properties. They possess, for example, antimicrobial properties against a number of gram-negative microorganisms such as, for example, *Pseudomonas aeruginosa*, *Escherichia coli*, *Aerobacter aerogenes*, *Salmonella pullorum*, *Proteus mirabilis* and *Proteus vulgaris*, and against a number of fungi such as, for example, *Candida abicans*, *Microsporum gypseum* and *Trichophyton granulosum*. These antimicrobial properties may be demonstrated by standard tests such as those described in "Antiseptics, Disinfectants, Fungicides and Sterlization", G.F. Reddish, Ed., 2nd, ed., Lea and Febringer, Philadelphia, 1957.

When the methaniminomethanophenanthrene derivatives of this invention are employed as analgesic agents in warm-blooded animals, e.g. rats, either alone or in combination with pharmacologically acceptable carriers, the proportion of which is determined by the solubility and chemical nature of the compound, chosen route of administration and standard biological practice. For example, they may be administered orally in solid form containing such excipients as starch, milk sugar, and so forth. They may also be administered orally in the form of solution or they may be injected parenterally. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in a range of from about 1.0 mg to about 200 mg per kilo although as aforementioned variations will occur. However, a dosage level that is in the range of from about 5 mg to about 75 mg per kilo is most satisfactory. Such doses may be administered once or twice a day, as required.

In preparing the compounds of this invention we prefer to use the following procedure.

An important aspect of this invention is the innovation of a facile synthesis of the novel ketolactams of formula II

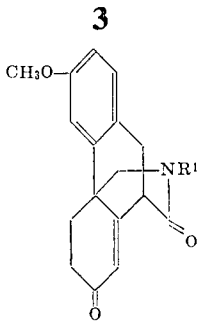

in which $R^1$ is as defined above, said ketolactams being the key intermediates for the preparation of the compounds of this invention.

The preparation of the ketolactams of Formula II may be illustrated as follows:

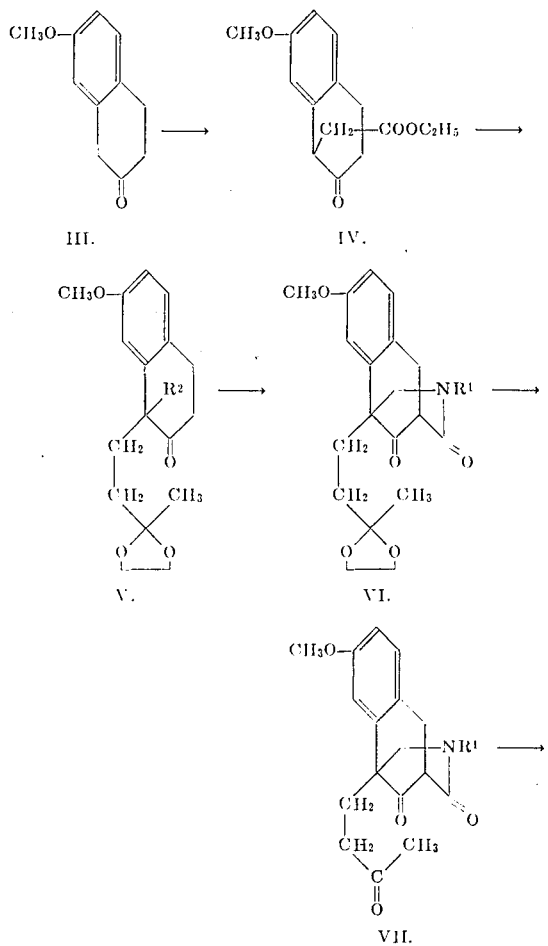

In practising the preparation of the ketolactams of Formula II, the starting material of Formula III, 7-methoxy-2-tetralone, described by G.B. Diamond and M.D. Soffer, J. Am. Chem. Soc., 74, 4,126 (1952), is converted to the ketoester IV by alkylation with ethylbromoacetate. A convenient method for accomplishing this alkylation is the method described by G. Stork et al., J. Am. Chem. Soc., 85, 207 (1963) via an enamine derivative, for example, the corresponding pyrrolidine intermediate. The ketoester IV is then transformed to the ketoester V ($R^2=CH_2COOC_2H_5$) by treating the corresponding alkali metal enolate of the former, for example the sodium enolate, with 2-methyl-1,3-dioxolane-2-propanol p-toluenesulfonate. (For the preparation of the latter compound, see Example 2, below).

After hydrolysis of the ketoester V ($R^2=CH_2COOC_2H_5$ to its corresponding free acid V ($R^2=CH_2COOH$) preferably by treatment with a base such as sodium hydroxide, the free acid is converted to the azide V ($R^2=CH_2CON_3$) by treatment with lower alkyl chloroformate, for example, ethyl chloroformate, in the presence of a base, for example, triethylamine, followed by sodium azide treatment. The resulting azide V ($R^2=CH_2CON_3$) rearranges on the warming in an inert solvent, for example, toluene, to yield the isocyanate V ($R^2=CH_{2bh}-N=C=O$).

The above isocyanate or treatment with sodium hydride in an inert solvent, for example, toluene, readily furnishes the ketolactam VI ($R^1=H$).

At this particular point of the process, it has been found to be exceedingly convenient to introduce the lower alkyl group, which is eventually the group represented by $R^1$ in the compounds of this invention of Formula I. Said introduction is accomplished by allowing the formation of ketolactum VI ($R^1=H$), described above, to go to completion, in the reaction mixture. The reaction mixture, which now contains the said lactam in the form of its corresponding sodium salt, is then treated with an excess of a suitable lower alkyl halide, for example, methyl iodide or ethyl chloride, to furnish the corresponding N-lower alkyl ketolactam, for example, the N-methyl ketolactam VI($R^1=CH_3$) or the N-ethyl ketolactam VI ($R^1=C_2H_5$), respectively.

The ketolactams of Formula VI when treated with acetone and p-toluenesulfonic acid, are converted to the corresponding diketolactams of Formula VII. The latter compounds are then transformed to their corresponding novel lactams of Formula II by treatment with p-toluenesulfonic acid in an inert solvent such as toluene. These latter compounds are the preferred key intermediates for the preparation of the compounds of this invention.

The compounds of this invention of Formula I in which $R^1$ is as defined above and ring C is represented by cyclohexane ring a, may be obtained by treating the corresponding key intermediates of Formula II, described above, with lithium aluminum hydride.

The compounds of this invention of Formula I in which $R^1$ is as defined above and ring C is represented by cyclohexane ring b, may be prepared in two reaction steps, whereby the key intermediates of Formula II are first reduced to the ketolactams of Formula VIII,

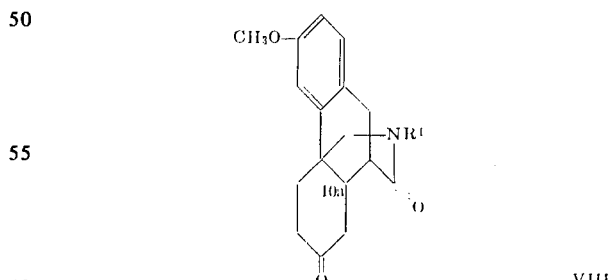

in which $R^1$ is as defined above, which in turn are reduced to the desired compound of Formula I in which $R^1$ is as defined above and ring C is represented by cyclohexane ring b.

In practice, the act of reducing the key intermediates of Formula II to the ketolactams of Formula VIII has been found to yield one isomer of the ketolactam VIII when the reduction is performed with a catalyst, for example 10 percent palladium on charcoal, in the presence of hydrogen; whereas, another isomer of the ketolactam VIII is obtained when the reduction is performed by means of lithium in ammonia. For convenience these two isomers are designated isomers A and B, respectively. These two isomers are a result of the newly introduced asymmetric center at carbon atom 10a of the methaniminomethanophenanthrene nucleus.

Subsequent reduction with lithium aluminum hydride of the A and B isomers of the ketolactams of Formula VIII furnishes the corresponding A and B isomers of the methaniminomethanophenanthrenes of Formula I in which $R^1$ is as defined above and ring C is represented by cyclohexane ring b., as defined above.

The compounds of this invention of Formula I in which $R^1$ is as defined above and ring C is the cyclohexane ring c are prepared from the key intermediate II by a process which may be illustrated as follows:

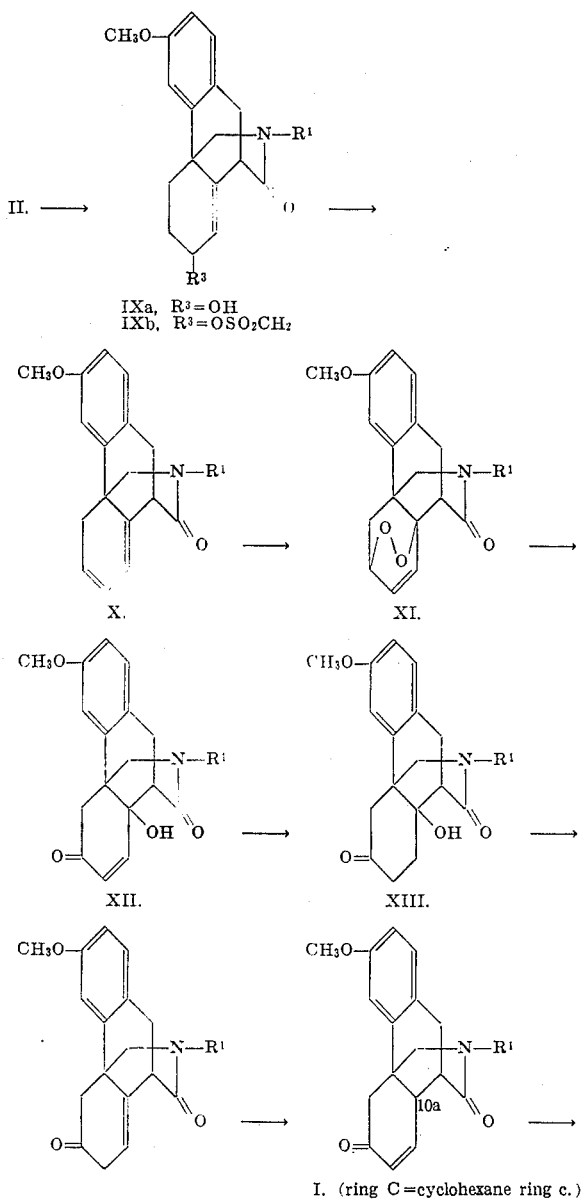

in which $R^1$ is as defined above.

In practicing this latter process a key intermediate of Formula II is reduced with sodium borohydride to yield to allylic alcohol IXa. The latter compound is converted to its corresponding mesylate, IXb, which is transformed to the diene X by warming in an organic base such as, for example collidine.

Alternatively, the diene X may be prepared by convering the allylic alcohol IXa to its corresponding benzoate and then subliming the benzoate under reduced pressure.

Irradiation by an ultraviolet wave source, for example, a mercury lamp, of a solution of the diene in an inert solvent, for example, ethanol, in the presence of oxygen and a catalyst, for example, eosin, followed by chromatography of the crude product on silica gel affords the γ-hydroxy-α,β-unsaturated ketolactam is then reduced with hydrogen in the presence of a catalyst, such as, for example, 10 percent palladium on charcoal, to yield the γ-hydroxy ketolactam XIII.

Alternatively, the γ-hydroxy ketolactam XIII may be prepared by irradiating with an ultraviolet wave source, for example, sunshine, a solution of the diene X in an inert solvent, for example, ethanol, in the presence of oxygen and a catalyst, for example, eosin, followed by hydrogenation of the total reaction mixture in the presence of a catalyst, for example, platinum oxide, to afford a mixture of the diol XVI, with lesser quantities of the desired γ-hydroxy ketolactam XIII with the diepoxide XVII.

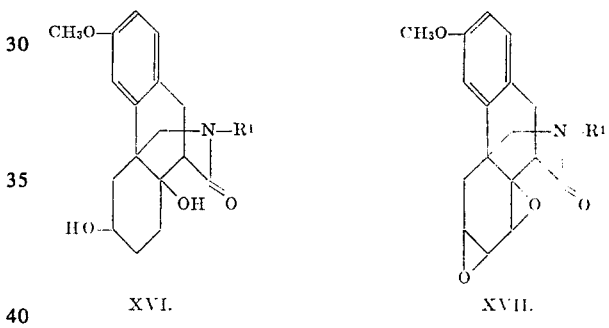

Subsequent treatment of this product mixture with an oxidizing agent, for example, sodium dichromate, converts the diol XVI. to the desired γ-hydroxy ketolactam XIII.

The γ-hydroxy ketolactam XIII, prepared as described above, is then dehydrated, preferably by treatment with thionyl chloride in pyridine to furnish the β,γ-unsaturated ketolactam XIV Treatment of the latter compound with an acid, for example, hydrochloric acid, yields the α,β-unsaturated ketolactam XV as a mixture of two isomers, which are readily separated by chromatography. Again, for convenience these isomers are designated A and B and result from the newly introduced assymmetric center at carbon atom 10a of the methaniminomethano-phenanthrene nucleus.

Subsequent reduction with lithium aluminum hydride of the A and B isomers of the α,β-unsaturated ketolactam of Formula XV yields the corresponding A and B isomers of the methaniminomethanophenanthrenes of formula I in which $R^1$ is as defined above and ring C is represented by cyclohexane ring c, as defined above.

The compounds of this invention of Formula I in which $R^1$ is as defined above and ring C is represented by cyclohexane ring d, as defined above, are prepared from the β,γ-unsaturated ketolactam of Formula XIV in which $R^1$ is as defined above by a process which may be illustrated as follows.

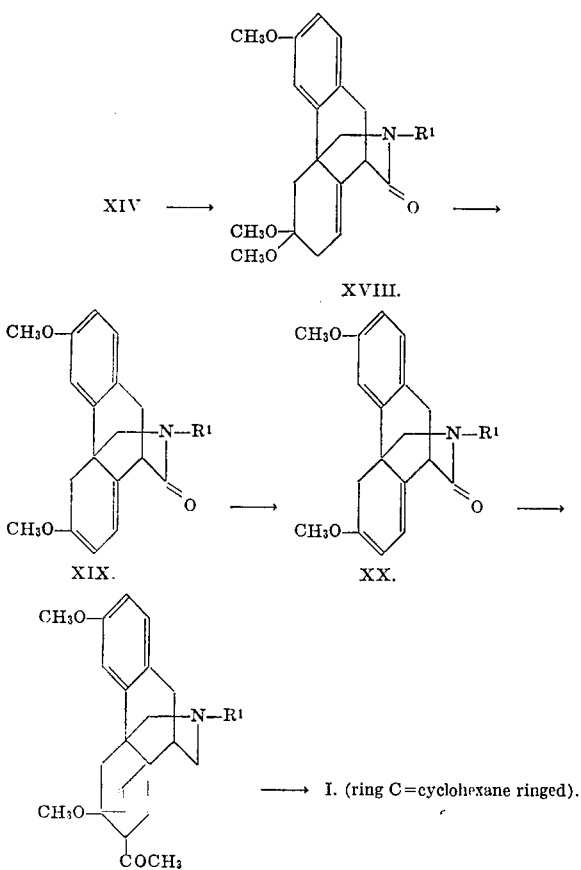

In practicing this latter process the β,γ-unsaturated ketolactam XIV, described above, is converted to the corresponding ketal of Formula XVIII by treatment with a methanolic solution of methyl or the formate in the presence of an acid catalyst, preferably p-toluenesulfonic acid. Subsequent pyrolysis of this ketal readily affords the methoxydiene of Formula XIX. This pyrolysis reaction may be conveniently performed by heating the ketal of Formula XVIII in a boiling solution of an inert solvent which has a boiling point between 100 to 200°C, for example, xylene. Treatment of the methoxydiene of Formula XIX with a suitable reducing agent, preferably lithium aluminum hydride, in an inert solvent, for example, tetrahydrofuran furnishes the methoxydiene amine of Formula XX. The latter compound is now subjected to a Diels-Alder reaction, see L.F. Fieser and M. Fieser, "Advanced Organic Chemistry", Reinhold Publishing Corporation, New York, N.Y., 1961, pp. 206–211, with methyl vinyl ketone to give the methyl ketone of Formula XXI. This reaction is accomplished readily by boiling a solution of the methoxydiene amine XX in methyl vinyl ketone. The methylketone XXI thus obtained may now be treated with an appropriate lower alkyl, benzyl, or phenethyl Grignard reagent, for example, methyl magnesium, bromide, ethyl magnesium chloride, propyl magnesium iodide, benzyl magnesium iodide or phenethyl magnesium bromide, in an inert solvent, for example, ether, to give the methaniminomethano-phenanthrenes of Formula I in which $R^1$ is as defined above, and ring C is represented by cyclohexane ring $d$ in which $R^2$ is a lower alkyl group, a benzyl or a phenethyl.

The following examples will illustrate further this invention.

EXAMPLE 1

1,2,3,4-Tetrahydro-7-methoxy-2-oxo-1-naphthaleneacetic acid ethyl ester (IV)

7-Methoxy-2-tetralone (III, 500 g), in benzene (1,300 ml) under dry nitrogen, is treated with pyrolidine (300 ml) and boiled for 5 hours. Water formed during the reaction is collected in a Dean-Stark water trap. The solution of tetralone enamine ($\gamma_{max}^{CHCl_3}$ 1,600, 1,575 cm$^{-1}$) is cooled in ice, treated cautiously with ethyl bromoacetate (780 ml), and then heated to reflux. After 24 hours, water (1,700 ml) is added and heating is continued for another 5 hours. The reaction mixture is then cooled and the organic phase is separated. The organic phase is rinsed with water (1,000 ml), dried and distilled. The fraction boiling from 160–170°C at 90 micron is identified as the title compound by infrared (IR) and nuclear magnetic resonance (NMR) spectra: $\gamma_{max}^{CHCl_3}$ 1720 cm$^{-1}$ (unresolved doublet) and $\tau$CDCl$_3$ 7.0 (d), 5.85 (q), 8.75 (t) (—CH$_2$CO$_2$C$_2$H$_5$).

EXAMPLE 2

2-Methyl-1,3-dioxolane-2-propanol p-toluenesulfonate

Ethyl acetoacetate (2,000 g) in benzene (3,300 ml) containing ethylene glycol (1,605 g) and toluene-p-sulphonic acid (2 g) is boiled for 30 hours. Water formed during the reaction is collected in a Dean-Stark water trap. The reaction mixture is distilled. The fraction boiling from 110–120°C at 18 mm is cautiously added to lithium aluminum hydride (200 g) in ether (3,000 ml). After 1 hour saturated aqueous sodium potassium tartrate (2,000 ml) is added and the resulting supernatant ether phase decanted, dried, and distilled. The fraction boiling at 90°C at 18 mm is dissolved in dry pyridine (850 ml) at 0°C and treated with p-toluenesulfonyl chloride (1,130 g). After 3 hours the mixture is diluted with ether (1,000 ml), exhaustively extracted with water (8 × 1 l.), dried and evaporated. The resulting oil, the title compound, is sufficiently pure for immediate use.

EXAMPLE 3

1,2,3,4-Tetrahydro-7-methoxy-1-]2-(methyl-1,3-dioxolan-2-yl)ethyl]-2-oxo-1-naphthaleneacetic acid ethyl ester (V, $R^2$= CH$_2$COOC$_2$H$_5$)

1,2,3,4-Tetrahydro-7-methoxy-2-oxo-1-naphthaleneacetic acid ethyl ester (IV, 200 g), prepared as described in Example 1, in dry benzene (1,500 ml) under nitrogen is treated with sodium hydride (38.5 g of 55 percent dispersion in oil) and boiled for 1 hour. After being cooled, the mixture is treated with a dry solution of 2-methyl-1,3-dioxolane-2-propanol p-toluenesulfonate (250 g), prepared as described in Example 2, in dry benzene (500 ml) and then boiled for 16 hours. The mixture is cooled, rinsed with ice water (2 × 3 l.), dried and evaporated to yield the title compound; $\gamma_{max}^{CHCl_3}$ 1723 (unresolved), 945 cm$^{-1}$ and $\tau$CDCl$_3$ 6.21 (s, unresolved), 9.2 (s).

EXAMPLE 4

1,2,3,4-Tetrahydro-7-methoxy-1-[2-(2-methyl-1,3-dioxolan-2-yl)ethyl]-2-oxo-1-naphthaleneacetic acid (V, $R^2 = CH_2COOH$)

The corresponding ethyl ester of the title compound (313 g), prepared as described in Example 3, is heated at an oil bath temperature of 90°C, with aqueous sodium hydroxide (5,000 ml of 5 percent w/v) for 90 minutes. After being cooled, the aqueous phase is decanted, extracted with dichloromethane (2 × 200 ml) and then the aqueous phase is neutralized to pH 7 with glacial acetic acid. The mixture is rapidly extracted with dichloromethane (3 × 300 ml). The extract is dried and evaporated to yield the title compound; $\gamma_{max}^{CHCl}$ 1,770, 1,708, 945 cm$^{-1}$.

EXAMPLE 5

1,2,5,6-Tetrahydro-9-methoxy-3-methyl-1-[2-(2-methyl-1,3-dioxolan-2-yl)ethyl]-1,5-methano-3-benzazocine-4,11(3H)-dione (VI; $R^1 = CH_3$)

The title compound of Example 4 (70 g), prepared as described in Example 4, in dry tetrahydrofuran (800 ml) magnetically stirred at −5°C, is treated successively with triethylamine (31.9 ml), ethyl chloroformate (21 ml), and, after 2 hours, sodium azide (36 g) in distilled water (75 ml). After a further 1 hour, all the while maintaining the temperature below 0°C, the reaction mixture is decanted, evaporated to reduced bulk and partitioned between dichloromethane (350 ml) and aqueous sodium bicarbonate (100 ml of 10 percent w/v). The organic phase is further rinsed with distilled water (2 × 100 ml), dried and evaporated to yield the corresponding azide (V, $R^2=CH_2CON_3$), $\gamma_{max}^{CHCl3}$ 2,145, 1,708, 945 cm$^{-1}$. This, in dry toluene (1,000 ml), is heated at an oil bath temperature of 80°C for 50 minutes. The resulting solution of the corresponding isocyanate (V, $R^2=CH_2-N=C=O$), $\gamma_{max}^{CHCl3}$ 2,255, 1,708, 945 cm$^{-1}$, is cooled, and treated with sodium hydride (17.5 g of 55 percent dispersion in oil), and then heated to boiling. During the first hour a vigorous evolution of hydrogen occurred concurrently with the formation of a gelatinous precipitate. This, the sodium salt of the secondary lactam (VI, R=H), is treated in situ with methyl iodide (100 g) and reflux is maintained for an additional 1 ¼ hour. The reaction mixture is then cooled, rinsed with distilled water (7,000 ml) and is dried and evaporated to yield the title compound, the N-methyl ketolactam VI ($R^{iodide}=CH_3$); $\gamma_{max}^{CHCl3}$ 1,735, 1,650, 945 cm$^{-1}$ and $\tau^{CDCl}_3$ 6.08 (s), 6.20 (s), 7.20 (s), 8.65 (s).

In the same manner, but using an equivalent amount of ethyl chloride instead of methyl iodide, 1,2,5,6-tetrahydro-9-methoxy-3-ethyl-1-[2-(2-methyl-1,3-dioxolan-2-yl)ethyl]-1,5-methano-3-benzazocine-4,11(3H)-dione, the N-ethyl ketolactam (VI, $R^1=C_2H_5$), is obtained.

In the same manner, but eliminating the treatment with methyl iodide and subsequent reflux, 1,2,5,6-tetrahydro-9-methoxy-1-[2-(2-methyl-1,3-dioxolan-2-yl)ethyl]-1,5-methano-3-benzazocine-4,11(3H)-dione, the secondary lactam (VI, $R^1=H$), $\gamma_{max}^{CHCl3}$ 3,400, 1,740, 1,675, 945 cm$^{-1}$ and $\tau$CDCl$_3$ 6.05 (s), 6.20 (s), 8.65 (s), is obtained.

EXAMPLE 6

1,2,5,6-Tetrahydro-9-methoxy-3-methyl-1-(3-oxobutyl)-1,5-methano-3benzazocine-4,11(3H)-dione (VII, $R^1=CH_3$)

The title compound of Example 5 (80.3 g), prepared as described in Example 5, in distilled acetone (600 ml) containing p-toluenesulfonic acid (3 g) is boiled for 1.5 hours. The bulk of the solvent is distilled under reduced pressure, the residue is diluted with distilled water (1,000 ml) and then extracted with dichloromethane (3 × 100 ml). The extract is dried and then evaporated to yield the title compound; $\gamma_{max}^{CHCl3}$ 1,660, 1,720, 1,740 cm$^{-1}$ and $\tau^{CDCl}_3$ 6.26 (s), 7.21 (s), 7.94 (s).

In the same manner, but using an equivalent amount of the N-ethyl ketolactam (VI, $R^1=C_2H_5$) or the secondary lactam (VI, $R^1=H$), both prepared as described in Example 5, instead of the title compound of Example 5, 3-ethyl-1,2,5,6-tetrahydro-9-methoxy-1-(3-oxobutyl)-1,5-methano-3-benzazocine-4,11(3H)-dione, the diketolactam (VII, $R^1=C_2H_5$), and 1,2,5,6-tetrahydro-9-methoxy-1-(3-oxobutyl)-1,5-methano-3-benzazocine-4,11(3H)-dione, the diketolactam (VII, $R^1=H$), are obtained, respectively.

EXAMPLE 7

3,4,9,10-Tetrahydro-6-methoxy-12-methyl-4a,10-(methaniminomethano)-phenanthrene-2,11(2H)-dione (II, $R^1=CH_3$)

The title compound of Example 6 (35 g), prepared as described in Example 6, in dry toluene (2,000 ml) containing p-toluenesulfonic acid (11 g), is boiled for 3 hours. Water formed during the reaction is collected in a Dean-stark water trap. The cooled mixture is rinsed with aqueous sodium bicarbonate (300 ml of 10 percent w/v) and distilled water (2 × 500 ml), dried and evaporated to dryness. The crude residue is purified by chromatography on silica gel (2,100 g) with chloroform-methanol (98:2 v/v) being used to elute the pure title compound; m.p. 160-162°C, $\gamma_{max}^{CHCl3}$ 1,650, 1,680 cm$^{-1}$ and $\lambda_{max}^{EtOH}$ 230 (12,100) and 280 (2,200) mµ.

In the same manner, but using an equivalent amount of the diketolactam (VII, $R=C_2H_5$) or the diketolactam (VII, R=H), both prepared a described in Example 6, instead of the title compound of Example 6, 12-ethyl-3,4,9,10-tetrahydro-6-methoxy-4a,10-(methaniminomethano)phenanthrene-2,11(2H)-dione, the ketolactam (II, $R^1=C_2H_5$), and 3,4,9,10-tetrahydro-6-methoxy-4a,10-(methaniminomethano)phenanthrene-2,11(2H)-dione, the ketolactam (II, $R^1=H$), are obtained, respectively.

EXAMPLE 8

3,4,9,10-Tetrahydro-6-methoxy-12-methyl-(2H)-4a,
10-(methaniminomethano)-phenanthren-2-ol (I, R$^1$ = CH$_3$ and ring C is cyclohexane ring $a$.)

The title compound of Example 7 (7.25 g) prepared as described in Example 7, in dry tetrahydrofuran (90 ml) containing lithium aluminum hydride (1.9 g), is heated under reflux for 15 hours. The tetrahydrofuran is then distilled under reduced pressure and the excess of lithium aluminum hydride is decomposed using saturated aqueous sodium potassium tartrate. The mixture is then extracted with chloroform (3 × 40 ml) which is then rinsed with dilute aqueous hydrochloric acid. The acidic aqueous phase is rendered basic with potassium hydroxide and extracted with chloroform (2 × 50 ml). The chloroform extract is dried with magnesium sulfate, filtered and evaporated to dryness to yield the title compound; mass spectrum: calculated 285; found, 285.

The title compound is further characterized as its hydrochloride salt, m.p. 190°C $\gamma_{max}^{CHCl_3}$ 3,590–3,400, 1,670 cm$^{-1}$.

In the same manner, but using an equivalent amount of the ketolactam (II, R$_1$= C$_2$H$_5$) or the ketolactam (II, R$^1$=H), both prepared as described in Example 7, instead of the title compound of Example 7, 12-ethyl-3,4,9,10-tetrahydro-6-methoxy-(2H)-4a,10-(methaniminomethano)-phenanthren-2-ol (I, R$^1$ = C$_2$H$_5$ and ring C is cyclohexane ring $a$) and 3,4,9,10-tetrahydro-6-methoxy-(2H)-4a,10-(methaniminomethano)-phenanthren-2-ol (I, R$^1$= H and ring C is cyclohexane ring $a$), are obtained, respectively.

EXAMPLE 9

Isomers A and B of 1,3,4,9,10,10a-hexahydro-6-methoxy-12-methyl-(2H)-4a,10-(methaniminomethano)phenanthren-2-ol (I; R = CH$_3$ and ring C is cyclohexane ring $b$.)

Isomer A:

The title compound of Example 7 (7.3 g), prepared as described in Example 7, in glacial acetic acid (45 ml) containing 10 percent palladium on charcoal (1 g), is shaken under an atmosphere of hydrogen for 1 hour at room temperature and pressure. The mixture is then filtered through celite and the filtrate evaporated under reduced pressure. The residue is partitioned between chloroform (70 ml) and saturated aqueous sodium bicarbonate. The organic phase is separated, dried with magnesium sulphate, filtered, and evaporated to yield isomer A of the ketolactam of Formula VIII 1,3,4,9,10,10a-hexahydro-6-methoxy-12-methyl-4a,10-(methaniminomethano)phenanthren-2-(2H)-one (VIII, R$^1$= CH$_3$), $\gamma_{max}^{CHCl_3}$ 1,715, 1,635 cm$^{-1}$ and $\tau^{CDCl_3}$ 6.20 (3H,$s$), 7.24 (3H,$s$). The latter compound, in dry tetrahydrofuran (90 ml)containing lithium aluminum hydride (1.9 g), is heated under reflux for 15 hours. The solvent is distilled under reduced pressure and the excess of lithium aluminum hydride decomposed using saturated aqueous sodium potassium tartrate. The mixture is then extracted with chloroform (3 × 40 ml) which is then rinsed with dilute hydrochloric acid. The acidic aqueous phase is rendered basic with potassium hydroxide and extracted with chloroform (2 × 50 ml). This chloroform extract is dried with magnesium sulphate, filtered and evaporated to yield isomer A of the title compound; mass spectrum: calculated, 287; found, 287. The isomer A of the title compound is further characterized as its hydrochloride salt, m.p. 250°C, $\gamma_{max}^{CHCl_3}$ 3,590 – 3,400 cm$^{-1}$.

Isomer B.

The title compound of Example 7 (3.3 g), prepared as described in Example 7, in dry tetrahydrofuran (300 ml) containing liquid ammonia (200 ml), is treated with lithium (165 mg) during 20 minutes at −80°C. Ammonium chloride (5 g) is then added, the solvent is evaporated under reduced pressure, and the residue partitioned between water (60 ml) and chloroform (75 ml). The organic phase is separated and dried with magnesium sulphate and then evaporated to yield isomer B of the ketolactam of Formula VIII, 1,3,4,9,10,10 hexahydro-6-methoxy-12-methyl-4,10-(methaniminomethano)phenanthren-2(2H)-one (VIII, R$^1$= CH$_3$), $\gamma_{max}^{CHCl_3}$ 1,175, 1,635 cm$^{-1}$, $\tau$CDCl$_3$ 6.21 (3H,$s$), 7.15 (3H,$s$), m.p. 210–212°C (recrystallized from ethanol). The latter compound, in dry tetrahydrofuran (125 ml) containing lithium aluminum hydride (0.875 g), is heated under reflux for 24 hours. The solvent is then evaporated under reduced pressure and the excess of lithium aluminum hydride decomposed with saturated aqueous sodium potassium tartrate. The mixture is extracted with chloroform (3 × 35 ml) which is then rinsed with dilute hydrochloric acid. The acidic aqueous phase is rendered basic with potassium hydroxide and extracted with chloroform (2 × 35 ml). This chloroform extract is dried with magnesium sulphate, filtered, and evaporated to yield isomer B of the title compound; mass spectrum: calculated 287; found, 287. The isomer B of the title compound is further characterized as its hydrochloride salt, m.p. 283°C, $\gamma_{max}^{CHCl_3}$ 3,590 – 3400 cm$^{-1}$.

By using the manipulative procedure described above for isomer A or isomer B, depending on which isomer is desired, but using an equivalent amount of the ketolactam (II, R$^1$= C$_2$H$_5$) or the ketolactam (II, R$^1$= H), both prepared as described in Example 7, instead of the title compound of Example 7, the A and B isomers of 12-ethyl-1,3,4,9,10,10a-hexahydro-6-methoxy-(2H)-4a,10-(methaniminomethano)phenanthren-2-ol (I, R$^1$= C$_2$H$_5$ and ring C = cyclohexane ring $b$) and 1,3,4,9,10,10a-hexahydro-6-methoxy-(2H)-4a,10-methaniminomethano)phenanthren-2-ol (I, R$^1$= H and ring C = cyclohexane ring $b$), are obtained, respectively, via their corresponding intermediate ketolactams of Formula VIII, 12-methyl-1,3,4,9,10,10a-hexahydro-6-methoxy-4a,10-(methaniminomethano)phenanthren-2 (2H)-one (VIII, R$^1$= C$_2$H$_5$) and 1,3,4,9,10,10a-hexahydro-6-methoxy-4a,10-(methaniminomethano)-phenanthren-2(2H)-one (VIII, R$^1$= H), respectively.

EXAMPLE 10

Isomers A and B of 3,4,10,10a-Tetrahydro-6-methoxy-12-methyl-(9H)-4a 10-(methaniminomethano)phenanthren-3-ol (I, $R^1 = CH_3$ and ring C is cyclohexane ring $c$.)

The title compound of Example 7 (88 mg), prepared as described in Example 7, in methanol (20 ml) containing water (100 mg) and sodium borohydride (90 mg) is stirred at room temperature for 2 hours. The solvent is evaporated and the residue partitioned between chloroform (50 ml) and aqueous hydrochloric acid (20 ml of 1 N). The aqueous phase is rinsed with additional chloroform (2 × 50 ml) and the total chloroform phase rinsed with water (30 ml) dried, and evaporated to yield allylic alcohol IXa, 3,4,9,10-tetrahydro-2-hydroxy-6-methoxy-12-methyl-4a,10-(methaniminomethano)-phenanthren-11-one (IXa, $R^1 = CH_3$), $\gamma_{max}^{CHCl_3}$ 3,580–3300, 1630 cm$^{-1}$ and $\tau CDCl_3$ 4.38 (d), 6.25 (s), 7.30 (s). The allylic alcohol IXa (24 mg) is treated in dry tetrahydrofuran at 0°C, containing dry pyridine (0.15 ml) with methane sulfonyl chloride (0.1 ml). After 2 hours, the mixture is diluted with water (30 ml) and extracted with chloroform (3 × 30 ml) which is then rinsed with water (20 ml). The total chloroform phase is dried and evaporated to yield the corresponding mesylate of the allylic alcohol, IXb; $\gamma_{max}^{CHCl_3}$ 1,650, 1,350, 1,175 cm$^{-1}$. The mesylate (28 mg) in collidine (5 ml) is heated at an oil bath temperature of 175°C for 17 hours. The reaction mixture is then diluted with water (50 ml) and extracted with chloroform (3 × 30 ml) which is dried and evaporated to dryness to yield an oil. Purification of the oil by chromatography on silica gel yields the diene X, 9,10-dihydro-6-methoxy-12-methyl-4a,10-(methaniminomethano)phenanthren-11(4H)-one (X, $R^1 = CH_3$); $\gamma_{max}^{CHCl_3}$ 1660 cm$^{-1}$, $\lambda_{max}^{EtOH}$ 279 $\mu$ (5,500). The latter compound (46 mg) in a dry ethanol (20 ml) containing eosin (1 mg) as catalyst, is irradiated at 20°C using a 100 watt mercury lamp while oxygen is bubbled through the solution. After 15 hours, the mixture is evaporated and the crude produce is purified by chromatography on silica gel to give the pure $\gamma$-hydroxy-$\alpha,\beta$-unsaturated keto lactam 3,4,10,10a-tetrahydro-10a-hydroxy-6-methoxy-12-methyl-4a,10-(methaniminomethano)phenanthrene-3,11(9H)-dione (XII, $R^1 = CH_3$); $\gamma_{max}^{CHCl_3}$ 1,675, 1,640 cm$^{-1}$ and $\tau_{max}^{EtOH}$ 224 (9,100) 278 (2,300) $\mu$. This $\gamma$-hydroxy-$\alpha,\beta$-unsaturated ketolactam (30 mg) in 50 ml of dry ethanol is hydrogenated at room temperature and normal pressure in the presence of 10 percent palladium on charcoal (10 mg). After 2 hours, the mixture is filtered and evaporated to yield the $\gamma$-hydroxy ketolactam, 1,2,3,4,10,10a-hexahydro-10a-hydroxy-6-methoxy-12-methyl-4a,10-(methaniminomethano)-phenanthrene-3,11(9H)-dione (XIII, $R^1 = CH_3$), $\gamma_{max}^{CHCl}$ 3,600–3,300, 1,710, 1,140 cm$^{-1}$ and $\lambda_{max}^{EtOH}$ 220(1,260), 279(378)$\mu$. The $\gamma$-hydroxy ketolactam (17 mg) in dry pyridine (0.4 ml) at 0°C is treated with thionyl chloride (0.1 ml). After 30 minutes, the reaction mixture is diluted with distilled water (50 ml) and extracted with chloroform (3 × 10 ml) which is then rinsed with water (2 × 10 ml) and dried. The chloroform extract is evaporated to dryness to yield the $\beta,\gamma$-unsaturated ketolactam, 3,4,9,10-tetrahydro-6-methoxy-12-methyl-4a,10-(methaniminomethano)phenanthrene-3,11(2H)-dione (XIV, $R^1 = CH_3$); $\gamma_{max}^{CHCl_3}$ 1,720, 1,640 cm$^{-1}$ and $\lambda_{max}^{EtOH}$ 220 (3,000), 280 (720) $\mu$. The latter compound (10 mg) in ethanol (10 ml) containing aqueous hydrochloric acid (100 mg of 5N), is boiled for 1 hour. The solvent is evaporated and water (10 ml) is added to the residue. The mixture is extracted with chloroform (3 × 10 ml). The extract is dried and then evaporated to yield a mixture of the A and B isomers of the $\alpha,\beta$-unsaturated ketolactam, 3,4,10,10a-tetrahydro-6-methoxy-12-methyl-4a,10-(methaniminomethano)phenanthrene-3,11(9H)-dione (XV, $R^1 = CH_3$). These isomers are separated by chromatography on silica gel: Isomer A $\gamma^{CHCl_3}$ 1,675, 1,640 cm$^{-1}$ and $\lambda_{max}^{EtOH}$ 223 (10,000), 281 (2,500) $\mu$; Isomer B $\gamma^{CHCl_3}$ 1,675, 1,640 cm$^{-1}$, and $\lambda_{max}^{EtOH}$ 222 (15,000), 280 (2,100) $\mu$. Finally, reduction of these A and B isomers with lithium aluminum hydride according to the procedure described in Example 8 yield the corresponding A and B isomers of the title compound: Isomer A: mass spectrum: calculated, 285; found 285; Isomer B- mass spectrum: calculated, 285; found, 285. Both the A and B isomers of the title compound are further characterized as their hydrochloride salts; m.p. 225–230°$\gamma_{max}^{CHCl_3}$ 3560 cm$^{-1}$ and m.p. 208–210°C, $\gamma_{max}^{CHCl}$ 3,450 cm$^{-1}$, respectively.

Alternatively, the diene X of this Example in which $R^1 = CH_3$ may be prepared in the following manner: a solution of the allylic alcohol IXa ($R^1 = CH_3$, 70.0 g) prepared as described in this Example, in dry tetrahydrofuran (500 ml) and dry pyridine (27 ml), is treated dropwise with benzoyl chloride (36 ml) while being stirred and cooled in an ice bath. Stirring is then continued at room temperature for 20 hours. The reaction mixture is filtered, the while solid rinsed with dichloromethane (20 ml) and the solvent evaporated under reduced pressure to about 200 ml. The residual solution is partitioned between water (500 ml) and chloroform (3 × 100 ml). The chloroform layer is separated and rinsed with saturated aqueous sodium bicarbonate, dried (MgSO$_4$), and evaporated to yield the crude oily N-methyl lactam IXc ($R^1 = CH_3$). This crude N-methyl lactam is pyrolyzed under reduced pressure (0.5 mm) in a tube which is heated to 200°C at one end by a small furnace. The sublimate, which is a mixture of the desired diene X and benzoic acid collects on the unheated end of the tube. The sublimate is dissolved in chloroform. The chloroform solution is rinsed with saturated sodium bicarbonate and water, dried and evaporated to give the desired diene X ($R^1 = CH_3$), m.p. 142–145°C(dec.), identical to the diene X ($R^1 = CH_3$) prepared by the other procedure of this Example.

Again alternatively, the $\gamma$-hydroxy ketolactam XIII ($R^1 = CH_3$) of this Example may be prepared in the following manner: A solution of the diene X($R^1 = CH_3$, 11.7 g) prepared as described in this Example, in ethanol (675 ml. of 95 percent) containing eosin (30 mg) is exposed to sunlight while oxygen is bubbled through the solution for 7 hours. Platinum oxide (2 g) is then added and the mixture agitated under hydrogen for 20 hours at room temperature and pressure. The reaction mixture is then filtered and evaporated under reduced pressure to a mixture containing the diepoxide (XVII ($R^1 = CH_3$), [1,10a: 2,3-diepoxy-1,3,4,9,10,10a-hexahydro-6-methoxy-12-methyl-2H-4a,10-(methanoiminomethano)-phenanthren-11-one], the diol XVI ($R^1 = CH_3$),[1,3,4,9,10,10a-hexahydro-3,10a-dihydroxy-6-methoxy-12-methyl-(2H)-4a,10-(methanoiminomethano)phenanthren-11-one,m.p. 286–288°] and the desired γ-hydroxy ketolactam XIII (R = $CH_3$). This mixture in glacial acetic acid (150 ml) containing sodium dichromate dihydrate (7.0 g) is stirred for 2 hours at room temperature. The solvent is then evaporated under reduced pressure and the residue is partitioned between aqueous sodium bicarbonate (500 ml of 5 percent w/v) and chloroform (3 × 200 ml). The chloroform layer is separated and rinsed with water (200 ml), dried (MgSO₄), and evaporated. The residue is crystallized from ethanol to afford the γ-hydroxy ketolactam XIII ($R^1 = CH_3$), m.p. 274–276°C, (dec), identical to the ketolactam, 1,2,3,4,10,10a-hexahydro-10a-hydroxy-6-methoxy-12-methyl-4a,10-(methaniminomethano)-phenanthrene-3,11(9H)-dione, prepared by the other procedure of this Example.

In the same manner, but using an equivalent amount of the ketolactam (II, $R^1= C_2H_5$) or the ketolactam (II, $R^1= H$), both prepared as described in Example 7, instead of the title compound of Example 7, the A and B isomers of 12-methyl-3,4,10,10a-tetrahydro-6-methoxy-(9H)-4a,10-(methaniminomethano)phenanthren-3-ol (I, $R^1= C_2H_5$ and ring C is cyclohexane ring c) and 3,4,10,10a-tetrahydro-6-methoxy-(9H)-4a,10-(methaniminomethano)phenanthren-3-ol (I, $R^1 = H$ and ring C is cyclohexane ring c), are obtained, respectively, via the respective intermediate, the β,γ-unsaturated ketolactams of formula XIV, 3,4,9,10,-tetrahydro-6-methoxy-4a,10-(methaniminomethano)phenanthrene-3,11(2H)-dione (XIV, $R^1 = H$) and 12-ethyl-3,4,9,10-tetrahydro-6-methoxy-4a,10-(methaniminomethano)-phenanthrene-3,11(2H)-dione (XIV, $R^1 = C_2H_5$).

EXAMPLE 11

1,2,3,4,9,10-Hexahydro-3,6-dimethoxy-α,N-dimethyl-α-phenethyl-3,10a-ethano-4a,10-(methaniminomethano)phenanthrene-2-methanol (I, $R^1 = CH_3$ and ring C is cyclohexane ring d in which $R^2$ is phenethyl).

A mixture of 3,4,9,10-tetrahydro-6-methoxy-12-methyl-4a,10-(methaniminomethane)phenanthrene-3,11(2H)-dione (298 mg; XIV, $R^1 = CH_3$) prepared as described in Example 10, in absoluted methanol (9 ml) containing p-toluenesulfonic acid (60 mg), and methyl orthoformate is stirred and boiled for 45 minutes. The mixture is then partitioned between dilute aqueous sodium bicarbonate (50 ml). The chloroform layer is separated and rinsed with brine (15 ml), dried (MgSO₄), and evaporated to yield the ketal XVIII ($R^1 = CH_3$), 3,4,9,10-tetrahydro-3,3,6-trimethoxy-12-methyl-2H-4a,10-(methaniminomethano)-phenanthren-11-one, as an oil, $\gamma_{max}^{CHCl_3}$ 2,900 and 1,630 cm⁻¹.

This latter compound (400 mg) is stirred and boiled in dry xylene (20 ml) for 1 hour. The solvent is evaporated under reduced pressure and the residue is purified by preparative layer chromatography on 1.25 mm alumina plates to yield the methoxydiene XIX ($R^1 = CH_3$), 9,10-dihydro-3,6-dimethoxy-12-methyl-4H-4a,10-(methaniminomethano)phenanthren-11-one, m.p. 172–174°C (after recrystallization from benzene), $\gamma_{max}^{CHCl}$ 2,900 and 1,630 cm⁻¹.

This methoxydiene (956 mg) in dry tetrahydrofuran (17 ml) is stirred and boiled with lithium aluminum hydride (310 mg) for 1.5 hours. Excess of lithium aluminum hydride is decomposed with saturated aqueous sodium potassium tartrate and the mixture extracted with chloroform (3 × 30 ml). The chloroform extract is dried (MgSO₄), and evaporated to give the methoxydiene amine XX ($R^1 = CH_3$), 9,10-dihydro-3,6-dimethoxy-12-methyl-4H-4a,10-(methaniminomethano)phenanthrene, as an oil, $\gamma_{max}^{CHCl}$ 3,000 and 1,665 cm⁻¹.

This methoxydiene amine (916 mg) in methyl vinyl ketone (6 ml) is boiled and stirred for 20 hours. The solvent is evaporated under reduced pressure and the residue is dissolved in dichloromethane (15 ml) which is then extracted with dilute sulfuric acid (30 ml of 3 percent). The aqueous phase is further extracted with chloroform (2 × 15 ml) and then rendered alkaline with ammonium hydroxide. The aqueous phase is then extracted with chloroform (3 × 25 ml), dried (MgSO₄), and evaporated to yield the methyl ketone of formula XI ($R^1 = CH_3$), 1,2,3,4,9,10-hexahydro-3,6-dimethoxy-N-methyl-3,10a-ethano-4a,10-(methaniminomethano)phenanthren-2-yl-methyl ketone, as an oil, $\gamma_{max}^{CHCl}$3 3,000 and 1,170 cm⁻¹, (corresponding hydrochloric acid addition salt has m.p. 232–234° ether and then ethanol-ether).

This methyl ketone of formula XI ($R^1 = CH_3$, 950 mg), in dry ether (400 ml) is treated with the solution of the Grignard reagent, phenethyl magnesium bromide, prepared from magnesium (600 mg) and phenethyl bromide (3 ml) in dry ether (120 ml). After being heated to reflux for 3 hours, the reaction mixture is treated with saturated aqueous ammonium chloride (100 ml), the ether phase is separated and the water layer is re-extracted with ether (2 × 20 ml). The organic phase is dried (MgSO₄) and evaporated. The resulting oily residue is purified by chromatography on alumina (act. III–IV),elution with petroleum ether and benzene) to afford the title compound, $\gamma_{max}^{CHCl_3}$ 3,460 cm⁻¹, τCDCl₃ 9.30, 8.98, 7.98, 6.50, 6.20, 5.25, 3.78, 3.25, 2.90 and 2.75.

The corresponding hydrochloric acid addition salt of the title compound has $\gamma_{max}^{KBr}$ 3,440, 2,835, 1,610, 1,574, 1,494, and 698 cm⁻¹, $\lambda_{max}^{EtOH}$ 228 (8,150), 281 (2,160) and 288 (2,000)mμ.

The title compound is characterized further by its picric acid addition salt, m.p. 222°C after recrystallization from ethanol.

In the same manner as described in this Example, but using an equivalent amount of methyl magnesium bromide, ethyl magnesium chloride, propyl magnesium iodide, or benzyl magnesium iodide, instead of phenethyl magnesium bromide, 1,2,3,4,9,10-hexahydro-3,6-dimethoxy-α,α,N-trimethyl-3,10a-ethano-4a,10-(methaniminomethano)phenanthrene-2-methanol, α-ethyl-1,2,3,4,9,10-hexahydro-3,6- dimethoxy-α-N-dimethyl-3,10a-ethano-4a,10-methaniminomethano)-phenanthrene-2-methanol, 1,2,3,4,9,10-hexahydro-3,6-dimethoxy-α,N-dimethyl-α-propyl-3,10a-ethano-4a,10-(methaniminomethano)phenanthrene-2-methanol and α-benzyl-1,2,3,4,9,10-hexahydro-3,6-dimethoxy-α,N-dimethyl-3,10a-ethano-4a,10(methaniminomethano)phenanthrene-2-methanol may be obtained, respectively.

In the same manner as described in this Example, but using an equivalent amount of the α,γ-unsaturated ketolactams of formula XIV(R¹ = H) and formula XIV (R¹ = C₂H₅), described in Example 10, instead of 3,4,9,10-tetrahydro-6-methoxy-12-methyl-4a,10-(methaniminomethano)phenanthrene-3,11(2H)-dione together with the appropriate Grignard reagent, such as, methyl magnesium bromide, ethyl magnesium chloride, propyl magnesium iodide, benzyl magnesium iodide, or phenethyl magnesium bromide, 1,2,3,4,9,10-hexahydro-3,6-dimethoxy-α,α-dimethyl-3,10a-ethano-4a,10-(methaniminomethano)phenanthrene-2-methanol, α-ethyl-1,2,3,4,9,10-hexahydro-3,6-dimethoxy-α-methyl-3,10a-ethano-4a,10-(methaniminomethano)phenanthrene-2-methanol, 1,2,3,4,9,10-hexahydro-3,6-dimethoxy-α-methyl-α-propyl-3,10a-ethano-4a,10-(methaniminomethano)phenanthrene-2-methanol, α-benzyl 1,2,3,4,9,10-hexahydro-3,6-dimethoxy-α-methyl-3,10a-ethano-4a,10-(methaniminomethano)phenanthrene-2-methanol, and 1,2,3,4,9,10-hexahydro-3,6-dimethoxy-α-methyl-α-phenethyl-3,10a-ethano-4a,10-(methaniminomethano)phenanthrene-2-methanol, and their corresponding N-ethyl derivatives may be obtained, respectively.

I claim:

1. A compound selected from those of the formula

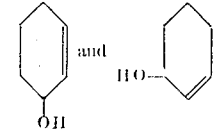

wherein R¹ is selected from the group which consists of hydrogen and lower alkyl and ring C of the methaniminomethanophenanthrene nucleus represents a substituted cyclohexene ring selected from the group which consists of and non-toxic acid addition salts thereof with pharmaceutically acceptable acids.

2. 3,4,9,10-Tetrahydro-6-methoxy-12-methyl-(2H)-4a,10-(methaniminomethano)phenanthren-2-ol, as claimed in claim 1.

3. The hydrochloride salt of 3,4,9,10-tetrahydro-6-methoxy-12-methyl-(2H)-4a,10-(methaniminomethano)phenanthren-2-ol, as claimed in claim 1.

4. 3,4,10,10a-Tetrahydro-6-methoxy-12-methyl-(9H)-4a,10-(methaniminomethano)phenanthren-3-ol, as claimed in claim 1.

5. The hydrochloride salt of 3,4,10,10a-tetrahydro-6-methoxy-12-methyl-(9H)-4a,10-(methaniminomethano)phenanthren-3-ol, as claimed in claim 1.

* * * * *